United States Patent
Iyoki

(10) Patent No.: US 6,799,212 B1
(45) Date of Patent: Sep. 28, 2004

(54) COMMUNICATION APPARATUS AND METHOD FOR RECEPTION NOTIFYING USING THE ARRIVAL NOTIFICATION AND THE END NOTIFICATION TRANSMITTED BY THE APPLET EMBEDDED IN THE HTML FILE

(75) Inventor: Yutaka Iyoki, Kawasaki (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 09/487,712

(22) Filed: Jan. 19, 2000

(30) Foreign Application Priority Data

Aug. 6, 1999 (JP) .......................................... 11-223776

(51) Int. Cl.[7] ........................ G06F 15/173; G06F 15/16
(52) U.S. Cl. ........................ 709/224; 709/203; 709/217; 709/227
(58) Field of Search ................................ 709/200, 201, 709/202, 203, 204, 206, 217, 229, 224, 226, 227, 207, 246

(56) References Cited

U.S. PATENT DOCUMENTS

| | | | |
|---|---|---|---|
| 5,881,233 A | | 3/1999 | Toyoda et al. ............... 709/233 |
| 5,892,909 A | * | 4/1999 | Grasso et al. ............... 709/201 |
| 5,913,041 A | * | 6/1999 | Ramanathan et al. ....... 709/233 |
| 6,006,252 A | * | 12/1999 | Wolfe ............................ 709/203 |
| 6,038,601 A | * | 3/2000 | Lambert et al. ............. 709/226 |
| 6,075,928 A | * | 6/2000 | Kitada et al. |
| 6,125,186 A | | 9/2000 | Saito et al. |
| 6,192,394 B1 | * | 2/2001 | Gutfreund et al. .......... 709/204 |
| 6,192,407 B1 | * | 2/2001 | Smith et al. ................. 709/200 |
| 6,195,689 B1 | * | 2/2001 | Bahlmann .................... 709/217 |
| 6,209,029 B1 | | 3/2001 | Epstein et al. |
| 6,230,189 B1 | | 5/2001 | Sato et al. |
| 6,289,371 B1 | | 9/2001 | Kumpf et al. |
| 6,327,610 B2 | * | 12/2001 | Uchida et al. ............... 709/206 |
| 6,374,291 B1 | * | 4/2002 | Ishibashi et al. ............ 709/203 |
| 6,424,718 B1 | * | 7/2002 | Holloway |
| 6,437,873 B1 | * | 8/2002 | Maeda ........................ 358/1.15 |
| 6,438,600 B1 | * | 8/2002 | Greenfield et al. ......... 709/229 |
| 6,449,646 B1 | * | 9/2002 | Sikora et al. ................ 709/224 |
| 6,459,423 B1 | | 10/2002 | Shimoosawa et al. |
| 6,539,422 B1 | | 3/2003 | Hunt et al. |
| 6,584,466 B1 | * | 6/2003 | Serbinis et al. ............. 709/226 |
| 6,618,749 B1 | * | 9/2003 | Saito et al. .................. 709/207 |
| 6,622,174 B1 | * | 9/2003 | Ukita et al. ................. 709/246 |

FOREIGN PATENT DOCUMENTS

| | | |
|---|---|---|
| JP | 10-79826 | 3/1998 |
| JP | 10-124418 | 5/1998 |

(List continued on next page.)

OTHER PUBLICATIONS

English Language Abstract of JP 10–269039.
English Language Abstract of JP 11–31114.

(List continued on next page.)

Primary Examiner—Rupal Dharia
Assistant Examiner—Quang N. Nguyen
(74) Attorney, Agent, or Firm—Greenblum & Bernstein, P.L.C.

(57) ABSTRACT

A multi-function system starts a WWW server by use of a WWW server section. When Java acceptable browser gains access to the WWW server, the WWW server section transfers an applet class file to Java acceptable browser. An applet is executed on the Java acceptable browser. The applet establishes a communication line between a TCP/IP processing section of a reception notify processing section and the applet, and a reception notify transmitting section notifies the applet of reception notification. The applet displays reception notification on PC. This makes it possible to notify an outer terminal of data reception in substantially real time.

9 Claims, 11 Drawing Sheets

FOREIGN PATENT DOCUMENTS

| | | |
|---|---|---|
| JP | 10124418 | 5/1998 |
| JP | 10269039 | 10/1998 |
| JP | 10-269039 | 10/1998 |
| JP | 11-31114 | 2/1999 |
| JP | 11-031114 | 2/1999 |
| JP | 11-184784 | 7/1999 |
| JP | 11184784 | 7/1999 |
| JP | 11187188 | 7/1999 |
| WO | 97/38510 | 10/1997 |

OTHER PUBLICATIONS

English Language Abstract of JP 11–184784.
English Language Abstract of JP 10–124418.
English Language Abstract of JP 11–187188.
English Language Abstract JP 10–269039.
English Language Abstract JP 11–031114.
English Language Abstract JP 10–124418.
English Language Abstract JP 11–184784.
English Language Abstract JP 10–79826.

* cited by examiner

COMMUNICATION APPARATUS AND METHOD FOR RECEPTION NOTIFYING USING THE ARRIVAL NOTIFICATION AND THE END NOTIFICATION TRANSMITTED BY THE APPLET EMBEDDED IN THE HTML FILE

BACKGROUND OF THE INVENTION

1. Field of the Invention

The present invention relates to a communication apparatus and a reception notifying method, and particularly to sending notification of reception of image information to an outer terminal in an IFAX apparatus.

2. Description of the Related Art

Conventionally, as disclosed in U.S. Pat. No. 5,881,233, there is proposed an Internet facsimile apparatus (hereinafter referred to as IFAX) which receives e-mail and prints it.

This IFAX gains access to a mail server periodically and receives e-mail, and automatically prints the content of the received e-mail by a printer. A user watches printed materials discharged to a paper-charging tray, and knows the arrival of data.

However, it is general that IFAX is shared by a plurality of users in an office, etc. For this reason, IFAX is not always set up at a site nearby all users. For example, if IFAX is set up at a different room or on a different floor, the user must go to the location where IFAX is set up to check whether e-mail is arrived to the user or ask the other person to check the e-mail.

In order to solve such inconvenience, it is considered that IFAX transmits e-mail, which informs that e-mail to the user is received, to a mail address, which the user normally employs on PC. However, in order to read this e-mail, it is necessary to access to a mail sever by a mailer executed on PC. For this reason, It has not been realized that the user is notified of e-mail arrival at IFAX in real time.

Such a problem is not limited to IFAX, and this similarly occurs in a case in which FAX data is received in image multi-function system, which is connected to LAN and which mounts a facsimile communication function thereon.

SUMMARY OF THE INVENTION

It is an object of the present invention is to provide a communication apparatus, which is capable of notifying an outer terminal of data reception in substantially real time, and to provide a reception notifying method.

The communication apparatus of the present invention publishes a hypertext, which has an applet embedded therein, to an outer terminal, performs communications with the applet executed by a browser on the outer terminal to which the hypertext is opened and transmits reception notification to the outer terminal when detecting reception of information so that notification of reception is performed at the outer terminal by the applet.

This makes it possible to notify the reception of information obtained by the communication apparatus at the outer terminal without installing software dedicated to the outer terminal.

BRIEF DESCRIPTION OF THE INVENTION

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

The following will specifically explain embodiments of the present invention with reference to the drawings accompanying herewith.

Figure 1:
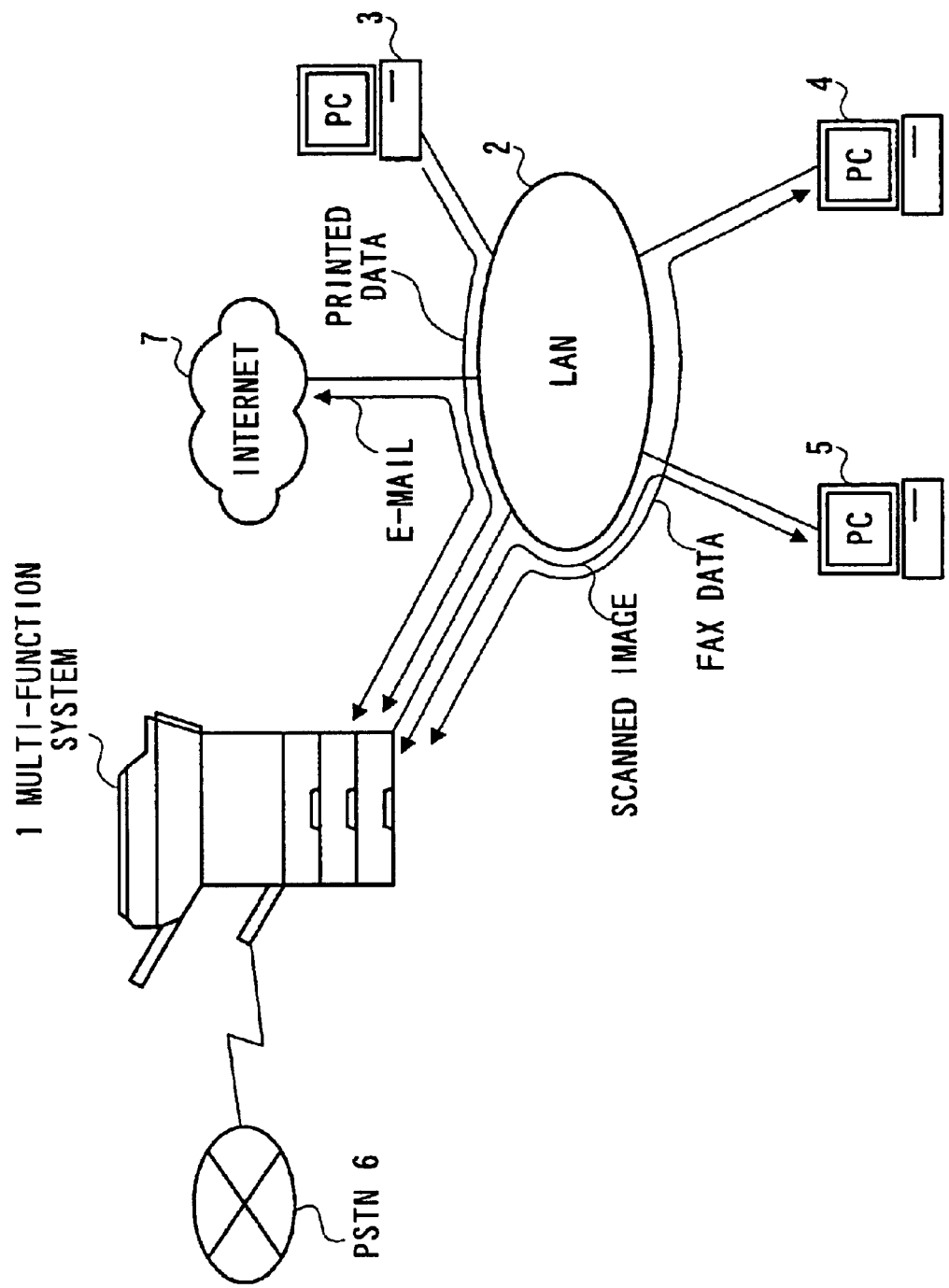
FIG. 1 is a conceptual view showing a network through which a multi-function system according to one embodiment of the present invention operates.

FIG. 1 is a conceptual view showing a network through which a multi-function system according to one embodiment of the present invention operates.

Multi-function system 1 is connected to LAN 2 and shared among PCs 3 to 5 connected to the same LAN 2. LAN 2 is constructed by, for example, Ethernet. Print data is transmitted to multi-function system 1 by PCs 3 to 5 through this LAN 2, and printed by multi-function system 1. Also, multi-function system 1 transmits an image, which is obtained by scanning an original, to PCs 3 to 5. Multi-function system 1 further transmits facsimile data received through PSNT 6 to PCs 3 to 5. On the contrary, facsimile data is transmitted from PCs 3 to 5 to multi-function system 1, and this facsimile data is transmitted from multi-function system 1 to PSTN 6.

Moreover, multi-function system 1 has an Internet facsimile function. Multi-function system 1 appends an image, which is obtained by scanning the original, to e-mail. Also, multi-function system 1 converts FAX data received through PSTN 6 to e-mail format. Multi-function system 1 sends these e-mail to Internet 7. It is of course that these e-mail are transmittable to PCs 3 to 5 through LAN 2.

Further, multi-function system 1 can receive email and Internet facsimile mail (hereinafter referred to as I-FAX mail) through LAN 2 and Internet 7. Multi-function system 1 prints text data of a text part of received e-mail and I-FAX mail, and the image appended to the text part. Multi-function system 1 converts the received e-mail to a format of facsimile data, allowing the converted data to be transmitted to the other facsimile apparatus.

This embodiment relates to the point in which each PC in the aforementioned network is informed of the reception of each of facsimile, e-mail, I-FAX mall in multi-function system 1.

It should be noted that the Multi-Function System is called Printer Copier, Fax Copier, Multi Function System, Multi-Function Station, etc., and it comprises any two or more of image processing functions such as a printer, a scanner, a copy machine, and a facsimile apparatus.

Figure 2:
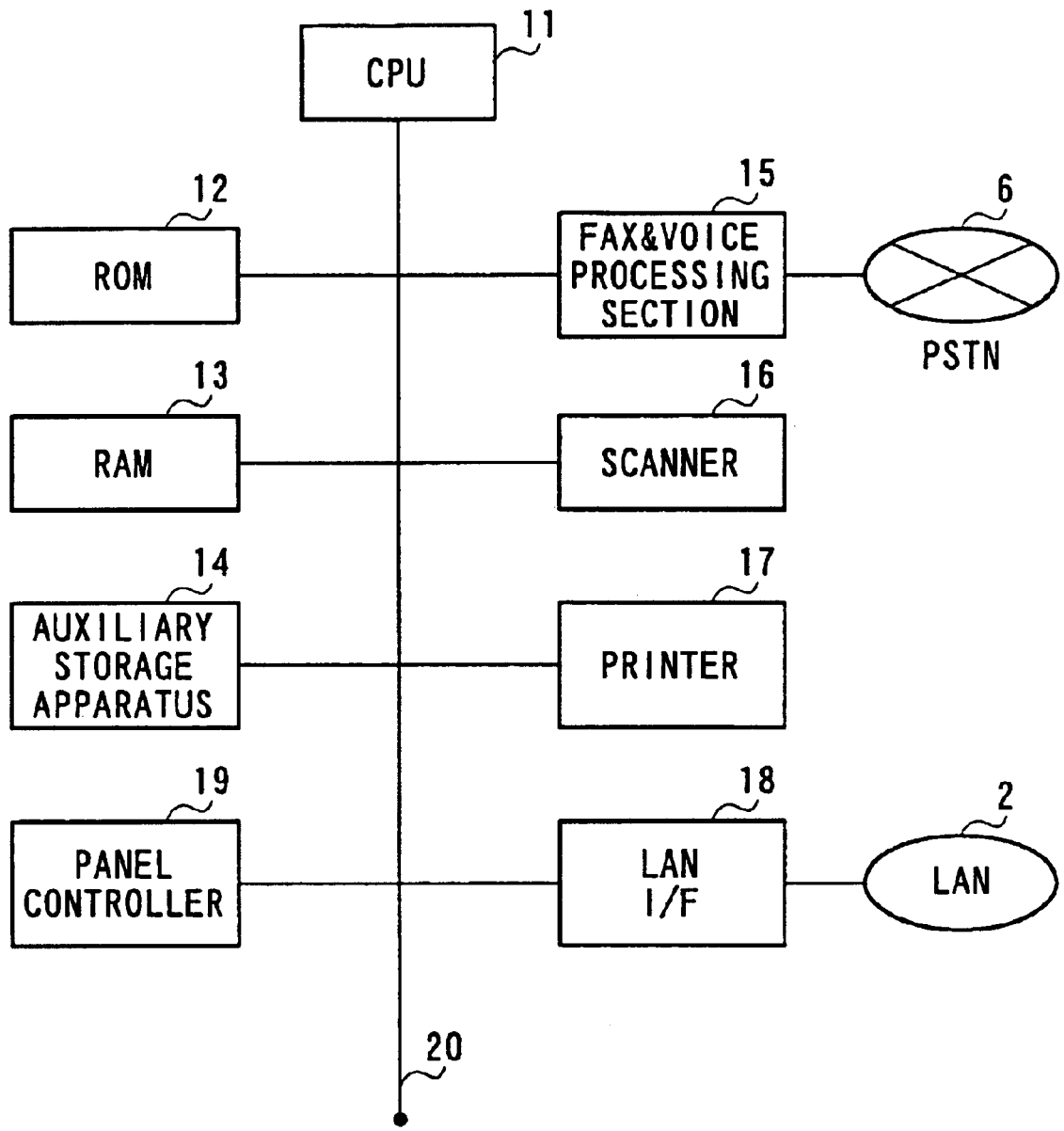
FIG. 2 is a hardware view showing the multi-function system according to the embodiment of the present invention.

FIG. 2 is a hardware block view showing the multi-function system 1 according to the first embodiment of the present invention. CPU 11 executes a program multi-function system 1 and controls the entirety of the apparatus. ROM 12 stores the program, which is executed by CPU 11.

RAM 13 has a work area where the program is executed, and a buffer area where various kinds of data such as e-mail, image files, etc. are temporarily stored.

Auxiliary storage apparatus 14 stores an HTML file group.

FAX and voice processing section 15 is connected to PSTN 6, and executes a facsimile reception, a facsimile transmission, and a call. FAX and voice processing section 15 modulates facsimile data and a voice, and outputs modulated data to PSTN 6, and demodulates modulated data, which has been received from PSTN 6, to facsimile data and voice data.

Scanner 16 scans an original, and obtains image data. Printer 17 prints various kinds of data including received image data.

LAN interface 18 is connected to LAN 2, and executes procedures, which are necessary for receiving and transmitting data on LAN 2.

Panel controller 19 has dial keys and a touch panel, and receives operator's operations such as a specification of destination, an instruction of transmission start, etc.

Each of CPU 11, ROM 12, RAM 13, auxiliary storage apparatus 14, FAX and voice processing section 15, scanner 16 printer 17, LAN interface 18, panel controller 19 is internally connected to bus 20. As a result, the respective sections are integrated to IFAX1.

Figure 3:
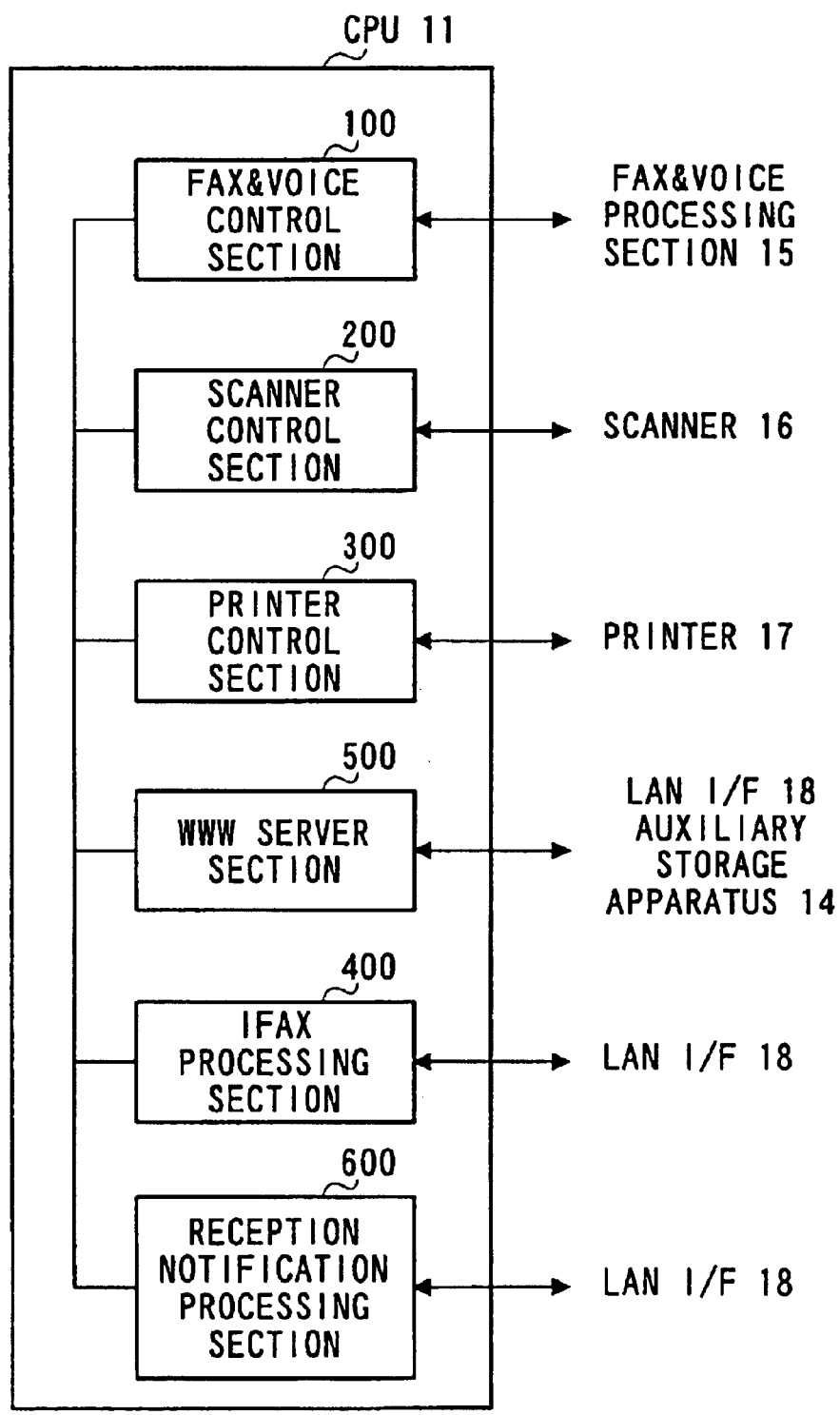
FIG. 3 is a block diagram showing the functions of the multi-function system according to the embodiment of the present invention.

ROM 12 stores a program, and CPU 11 executes the program. Functions resultantly constructed will be explained as follows. FIG. 3 is a block diagram showing the functions of the multi-function system according to the first embodiment.

Multi-function system 1 comprises FAX and voice processing section 100, scanner control section 200, and printer control section 300, and controls the respective processing sections of FAX and voice processing section 15, scanner 16 and printer 17.

Multi-function system 1 also comprises an IFAX processing section 400. This IFAX processing section 400 receives and transmits e-mail using LAN interface 18 through LAN 2. Namely, IFAX processing section 400 receives the e-mail from a sender, and prints received data using printer 17. At this time, if an image file is appended to the e-mail, the content of the image file is printed by printer 17. While, IFAX processing section 400 converts imaged data obtained by scanner 16 to e-mail and transmits it.

Figure 4:
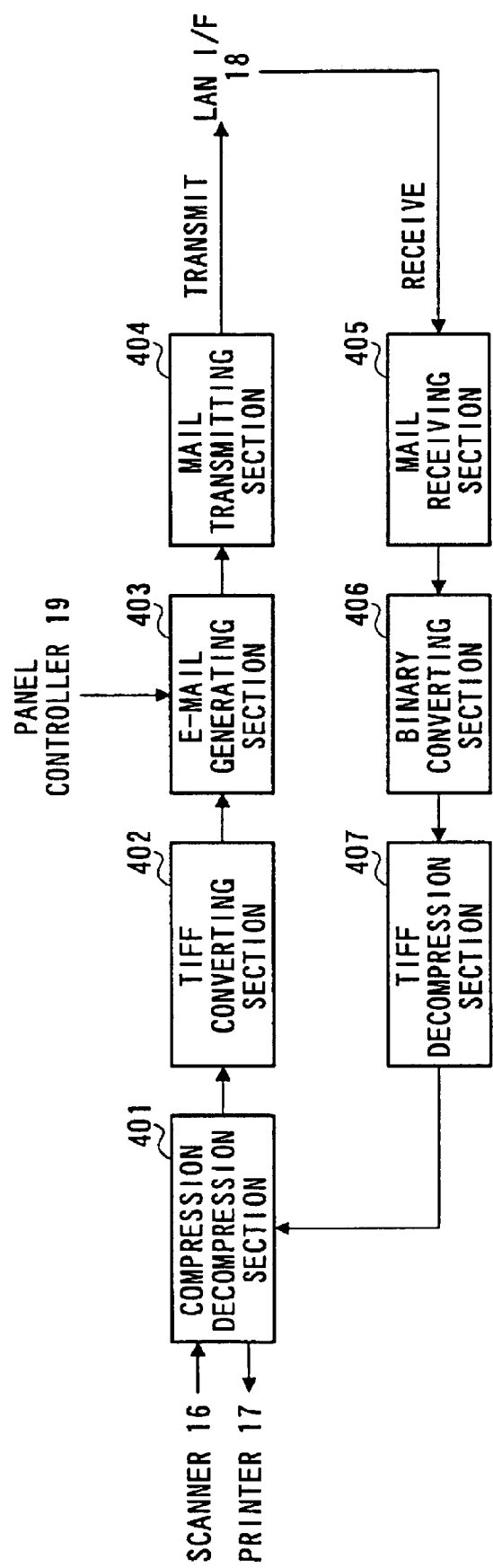
FIG. 4 is a block diagram showing the function of an IFAX processing section of the multi-function system according to the embodiment of the present invention.

FIG. 4 is a block diagram showing the function of IFAX processing section 400. Scanner control section 200 sends raw image data (for example, bit map data), which is scanned by scanner 16, to IFAX processing section 400. In IFAX processing section 400, compression and decompression section 401 compresses row image data by compression method such as MH, and obtains compression files. The compression is carried out by one page of original. These compression files are converted to one TIFF (Tag Image File Format) file. This TIFF file is appended to a multi-part mail in accordance with, for example, MIME (Multipurpose Internet Mail Extension), so that I-FAX mail is generated. Also, mail address of this I-FAX mail, which is input by panel controller 19, is specified to address [To:].

The generated I-FAX mail is transmitted to the mail server by mail transmitting section 404 through LAN interface 18 in accordance with SMTP (Simple Mail Transfer Protocol).

While, in IFAX processing section 400, when mail receiving section 405 receives I-FAX mail through LAN Interface 18, binary converting section 406 converts appended data included in I-FAX mail to binary data from a text code so as to obtain a TIFF file. TIFF decompression section 407 decompresses the obtained ITFF file so as to obtain a compression file. Compression and decompression section 401 decompresses this compression file so as to obtain row image data. This image data is printed by printer 17.

Also, multi-function system 1 comprises WWW server section 500. This WWW server section 500 publishes a WWW page to PCs 3 to 5 through LAN 2. Moreover, multi-function system 1 comprises reception notify processing section 600. This reception notify processing section 600 notifies PCs 3 to 5 of the reception of FAX, e-mail, and I-FAX mail.

Figure 5:
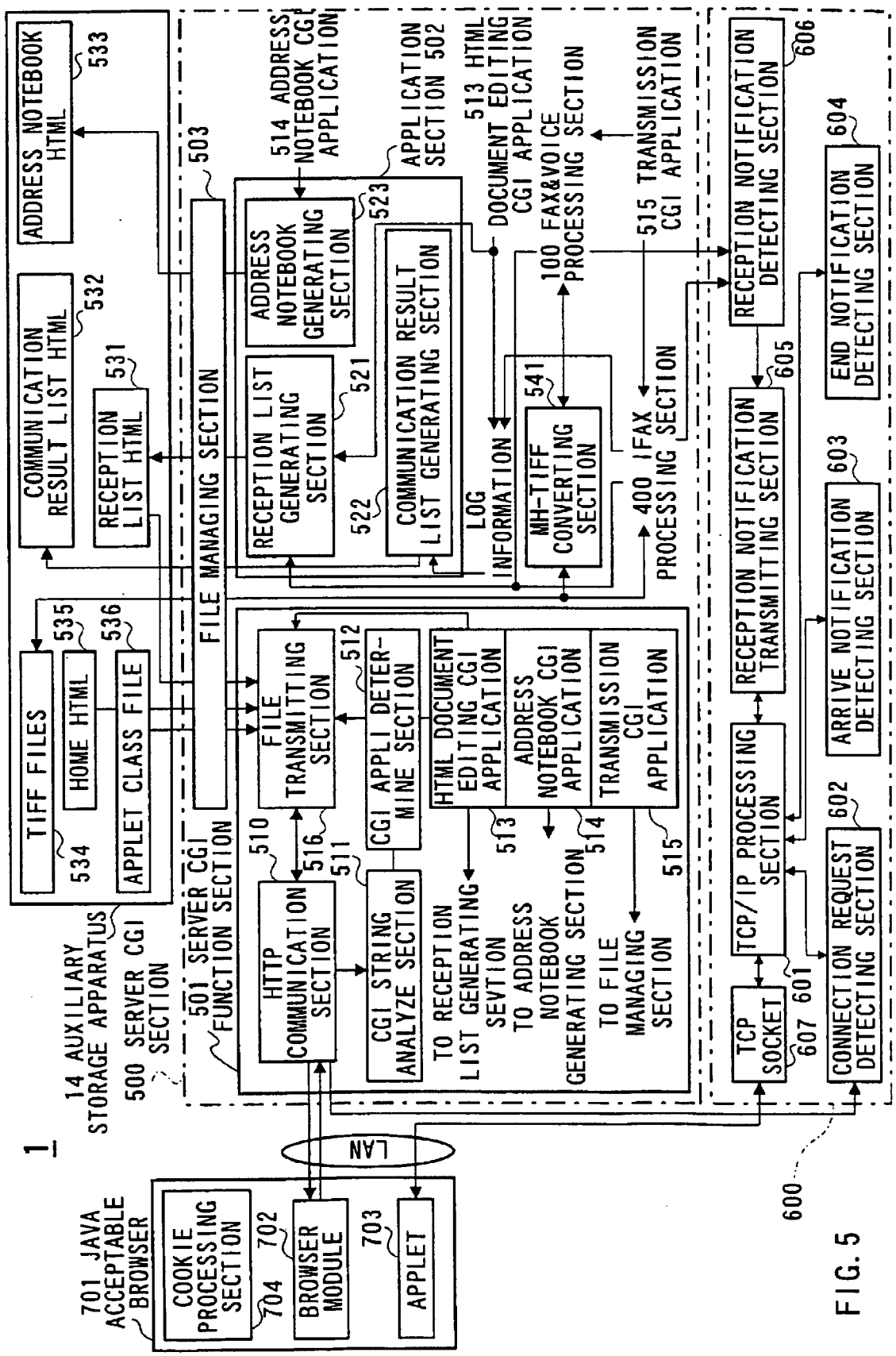
FIG. 5 is a block diagram explaining functions of a WWW server section and a reception notify processing section of the multi-function system according to the embodiment of the present invention.

FIG. 5 is a function block diagram showing the WWW server section and reception notify processing section in the multi-function system according to the embodiment of the present invention.

WWW server section 500 comprises server CGI function section 501, an application section 502, and file managing section 503.

Server CGI function section 501 transfers an HTML file to Java acceptable browser 701, which operates mainly on PCs 3 to 5, and provides CGI (Common Gateway Interface) function, which meditates between Java acceptable browser 701 and an application. CGI is an interface that performs processing in which the server starts another program in response to request from the WWW browser so as to return the result to the WWW server.

In this server CGI function section 501, HTTP communication section 510 communicates with browser module 702 of Java acceptable browser 701 in accordance with HTTP (Hyper Transfer Protocol). Data received from the browser module by HTTP communication section 510 is analyzed by CGI string analyze section 511.

CGI string analyze section 511 sends received data to CGI appl determine section 512 when detecting a character string of CGI processing from received data. CGI appli determine section 512 activates a CGI application in accordance with the character string in received data. The CGI application decodes received data, which is encoded in URL, and executes predetermined processing. The CGI application includes HTML document edit CGI application 513, which edits HTML document, address notebook CGI application 514, which generates an address notebook, and transmission CGI application 515.

While, file transmitting section 516 receives a file in which a file request is output from browser module 702, and sends it to HTTP communication section 510.

Application section 502 includes reception list generate section 521, communication result list generate section 522, and address notebook generate section 523. Reception generate section 521 is an application that generates HIML file (hereinafter referred to as reception list html) 531 for list displaying received facsimile data, e-mail, and I-FAX mail. This reception list generate section 521 receives reception facsimile data from FAX and voice processing section 100 and also receives e-mail and I-FAX mail from IFAX processing section 400, and generates reception list html. Also, reception list generate section 521 performs editing such as deletion, rewrite, move, etc., with respect to reception list html by a command given from HTML document edit CGI application 514 and reception data.

Next, communication result list generate section 522 receives log information, which shows a communication result, from FAX and voice processing section 100 and IFAX processing section 400 and generates and updates HTML file (hereinafter referred to as communication result html), which displays a communication result list.

Also, address notebook generate section 523 generates and updates HTML file (hereinafter referred to as html) 533, which displays an address notebook by a command from address notebook CGI application 514 and reception data.

File managing section 503 manages a HTML file stored in auxiliary storage apparatus 14, TIFF file, etc. Auxiliary storage apparatus 14 stores TIFF files 534, HOME html 535 and applet class file 536 in addition to reception list htm 1531, communication result 532 and address notebook html 533.

TIFF files 534 includes TIFF file, which is obtained when facsimile data received by FAX and voice processing section 100 is converted by MH-TIFF converting section 541, and TIFF file appended to I-FAX mail received by IFAX processing section 400.

HOME html 535 is HTML file, which is opened when Java acceptable browser 701 gains first access to WWW server section 500. Applet class file 536 is transferred to Java acceptable browser 701 together with this HOME html 535.

While, reception notify processing section 600 has TCP/IP processing section 601. TCP/IP processing section 601 opens TCP socket 607 and communicates with applet 703, which is executed by Java acceptable browser 701, in accordance with TCP/IP protocol. A message received by this TCP/IP processing section 601 is sent to connection request detecting section 602 for detecting a connection request from applet 703, arrive notify detecting section 603 for detecting arrive notification from applet 703, and end notification detecting section 604 for detecting end notification from applet 703.

Also, reception notify processing section 600 has reception notify transmitting section 605.

Reception detecting section 606 is connected to this reception notify transmitting section 605. This reception detecting section 606 monitors FAX and voice processing section 100 and IFAX processing section 400, and detects the reception of facsimile data, e-mail, and I-FAX processing section 400.

Figure 6:
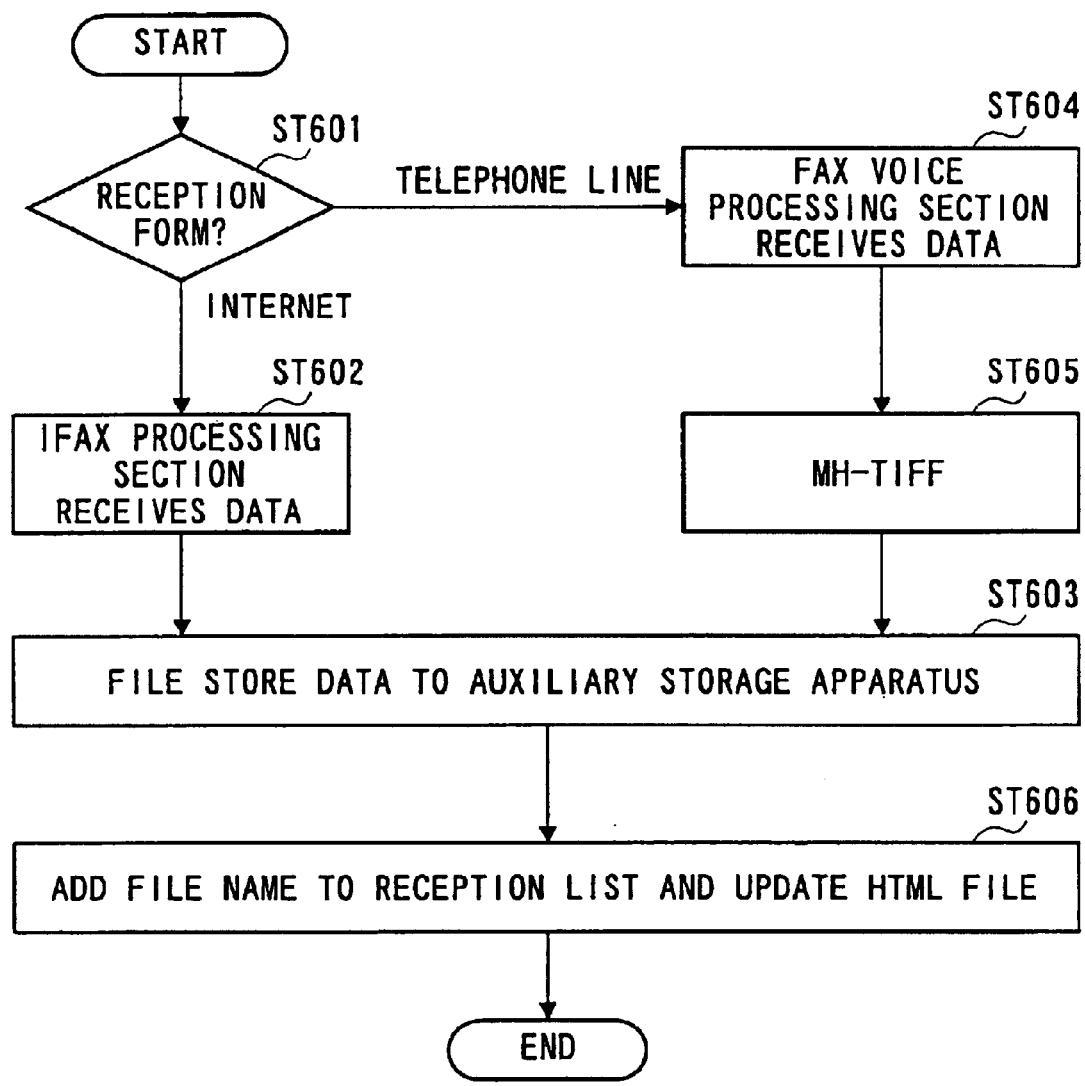
FIG. 6 is a flowchart showing a reception list generating operation of the multi-function system according to the embodiment of the present invention.

Next, an operation of the above-configured multi-function system according to the above-mentioned embodiment will be explained. FIG. 6 is a flowchart showing an operation of reception list generation in the multi-function system according to the above embodiment.

When data reception occurs, it is determined whether or not the reception form is a telephone line or Internet (ST601). It is determined that a case in which IFAX processing section 400 receives e-mail or I-FAX mail is a reception from Internet. In this case, if IFAX processing section 400 receives e-mail (ST602) and appended data is TIFF file, a file name, for example, "mail0001.tif" is added thereto, and the TIFF file is stored in TIFF files 534 of auxiliary storage apparatus 14 (ST603).

While, it is determined that a case in which FAX and voice processing section 100 receives facsimile data is a reception from the telephone line. In the case of the reception from the telephone line, FAX and voice processing section 100 receives facsimile data (ST604), and received facsimile data (MH file) is converted to TIFF file by MH-TIFF converting section 541 (ST605). A file name (for example, "FAX000.1.tif") is added to this TIFF file, and stored in TIFF files 534 (ST603). Thereafter, since reception list generate section 521 adds the file name to the reception list, reception list HTML is updated (ST606).

Figure 7:
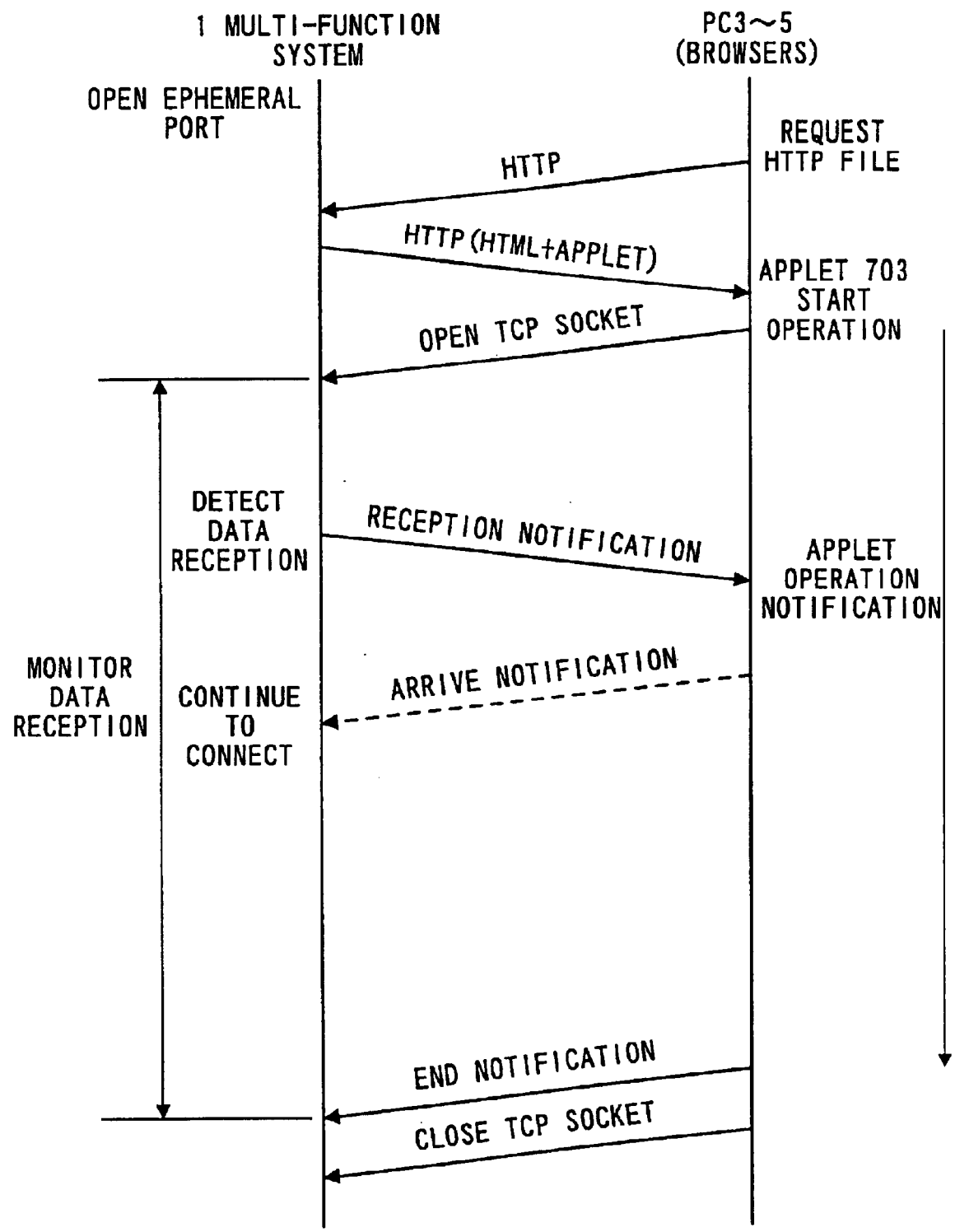
FIG. 7 is a sequence view showing a procedure of communications between the multi-function system according to the embodiment of the present invention and PC.

Next, communications between multi-function system 1 and PCs 3 to 5 will be explained. FIG. 7 is a sequence view showing procedures of communications between multi-function system 1 according to the above embodiment and PCs.

Browser module 702 of Java acceptable browser 701 executed by PCs 3 to 5 gains access to the WWW server started by the multi-function system 1, and requests WWW server section 500 to transfer HOMEhtml.

File transmitting section 516 of WWW server section 500 detects this request, and requests HOME html of the file managing section 503. File managing section 503 sends HOME html 535 stored in auxiliary storage apparatus 14 to file/transmitting section 516. File transmitting section 516 instructs HTTP communication section 510 to transmit HOME html 535 to browser module 702. Browser module 702 displays HOME html on the screens of PCs 3 to 5.

In this HOME html, a link is pasted to applet class file 536 stored in auxiliary storage apparatus 14. Browser module 702 reads applet class file 536 to which the link is pasted simultaneously when reading the Home html. Java acceptable browser 701 opens applet class file 536 as to operate applet 703. Applet 603 is thus embedded in the Home html.

While, HTTP communication section 510 of multi-function system 1 opens an ephemeral port, and waits for a connection request from applet 703. Applet 703 of PCs 3 to 5 transmits the connection request to the ephemeral port. In the multi-function system 1, connection detecting section 602 detects the connection request. Thereafter, TCP socket 607 is opened therebetween.

When TCP socket 607 is opened, reception detecting section 606 starts to detect data reception at FAX and voice processing section 100 and IFAX processing section 400. When reception detecting section 606 detects the reception of data, a reception notification is transmitted to applet 703. Applet 703 displays a window showing the reception notification when receiving this reception notification.

Also, applet 703 transmits an arrive notification to TCP/IP processing section 601 periodically. In multi-function system 1, arrive notify detecting section 603 detects an arrive notification to continue the connection between multi-function system 1 and applet 703.

When applet 703 is in an end state, applet 703 transmits an end notification to multi-function system 1. In multi-function system 1, end notification detecting section 604 detects the end notification. Thereafter, TCP socket 607 is closed.

Figure 8:
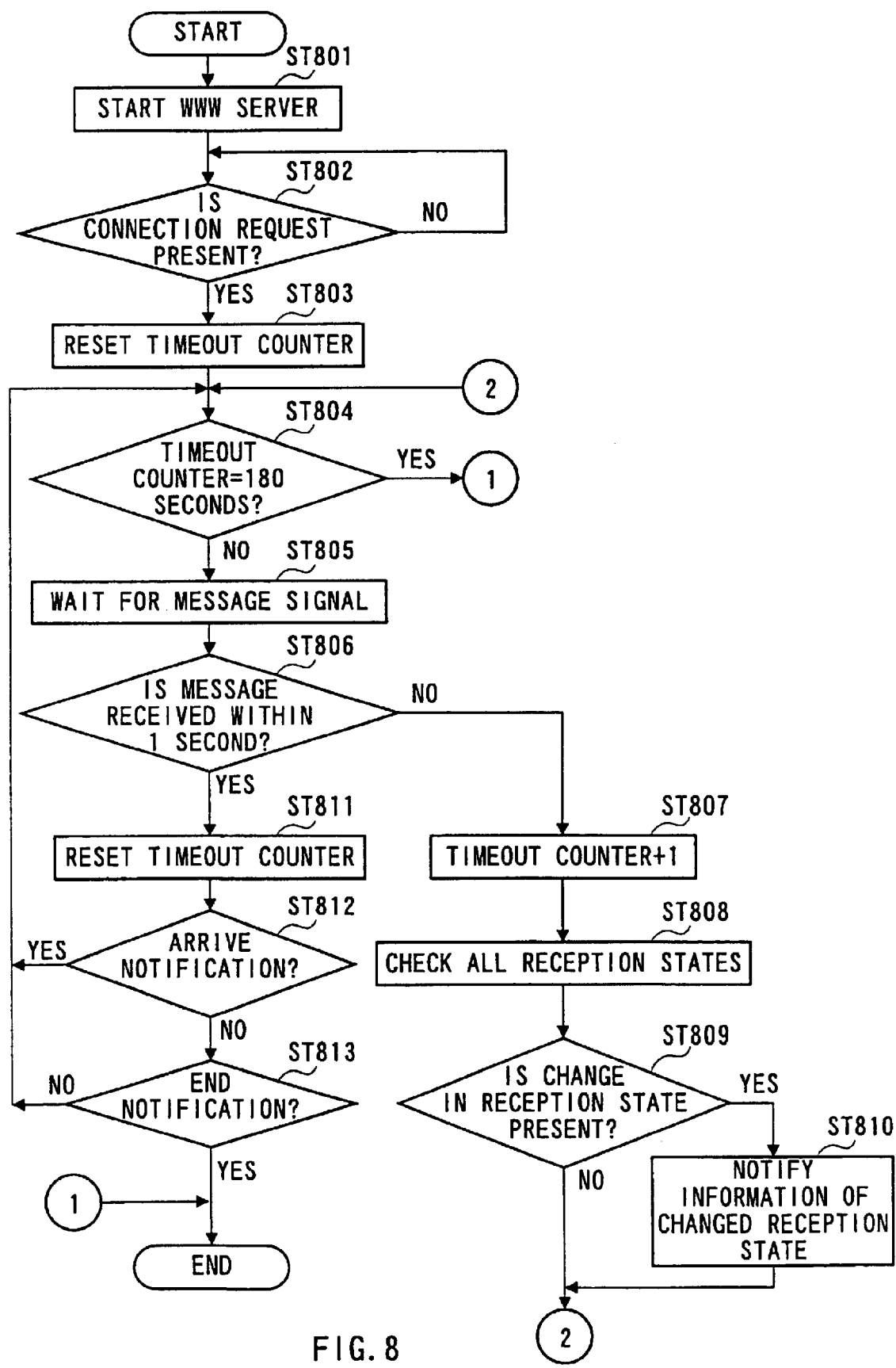
FIG. 8 is a flowchart showing the respective steps of reception notify processing of the multi-function system according to the embodiment of the present invention.

Next, an operation of multi-function system 1 will be explained. FIG. 8 is a flowchart showing the respective steps of reception notify processing of the multi-function system according to the embodiment of the present invention.

Multi-function system 1 is activated to start the WWW server by WWW server section 500 (ST801). Thereafter, TCP/IP processing section 601 opens the ephemeral port, and waits for the connection request from PCs 3 to 5 (ST 802).

Multi-function system 1 resets a timeout counter when receiving the connection request (ST803). Next, it is determined whether or not the timeout counter is a timeout value (ST804). If the timeout counter is not the timeout value, the multi-function system 1 is set to be in a waiting state of a message reception from applet 703 (ST805).

Multi-function system 1 determines whether or not the message is received within one second (ST806). If no message is received within one second, the timer count is incremented by 1 (ST807). Next, reception states of all data of facsimile, e-mail, and IFAX mail are obtained from FAX and voice processing section 100 and IFAX processing section 400. Then, it is determined whether or not a change has occurred In the reception state (ST809). If the change has occurred in the reception state, applet 703 is notified of the changed reception state (ST810). Thereafter, the operation goes back to ST804. The reception notification includes sources (FAX, e-mall, IFAX etc.,) of reception data and sender information (mail address, FAX number, etc.).

While, in ST 806, if the message is received within one second, the timeout counter is reset (ST 811) to check whether or not the message is an arrive notification (ST 812). If the message is the arrive notification, the operation goes back to ST 804. On the other hand, if it is not the arrive notification, it is checked whether or not the message is an end notification (ST813). If the message is the end notification, processing is ended. If the message is not the end notification, processing goes back to ST804.

By each processing of ST805, ST808 to ST810, multi-function system 1 obtains the reception states of all data at one second interval, and notifies applet 703 of reception information if there is a change in the reception state. The reception states of all data of facsimile, e-mail, and IFAX mail are not necessarily obtained, and the reception state of at least one data may be obtained.

Also, by each step of ST804, ST806, and ST811, when the timeout counter reaches the same value as the timeout value after receiving the message from applet 703 finally, multi-function system 1 ends the monitor of the reception state.

Furthermore, in ST812, multi-function system 1 continues the connection when receiving the arrive notification from applet 703.

Multi-function system 1 performs the reception notification as mentioned above, and prints the content by printer 17.

Figure 9:
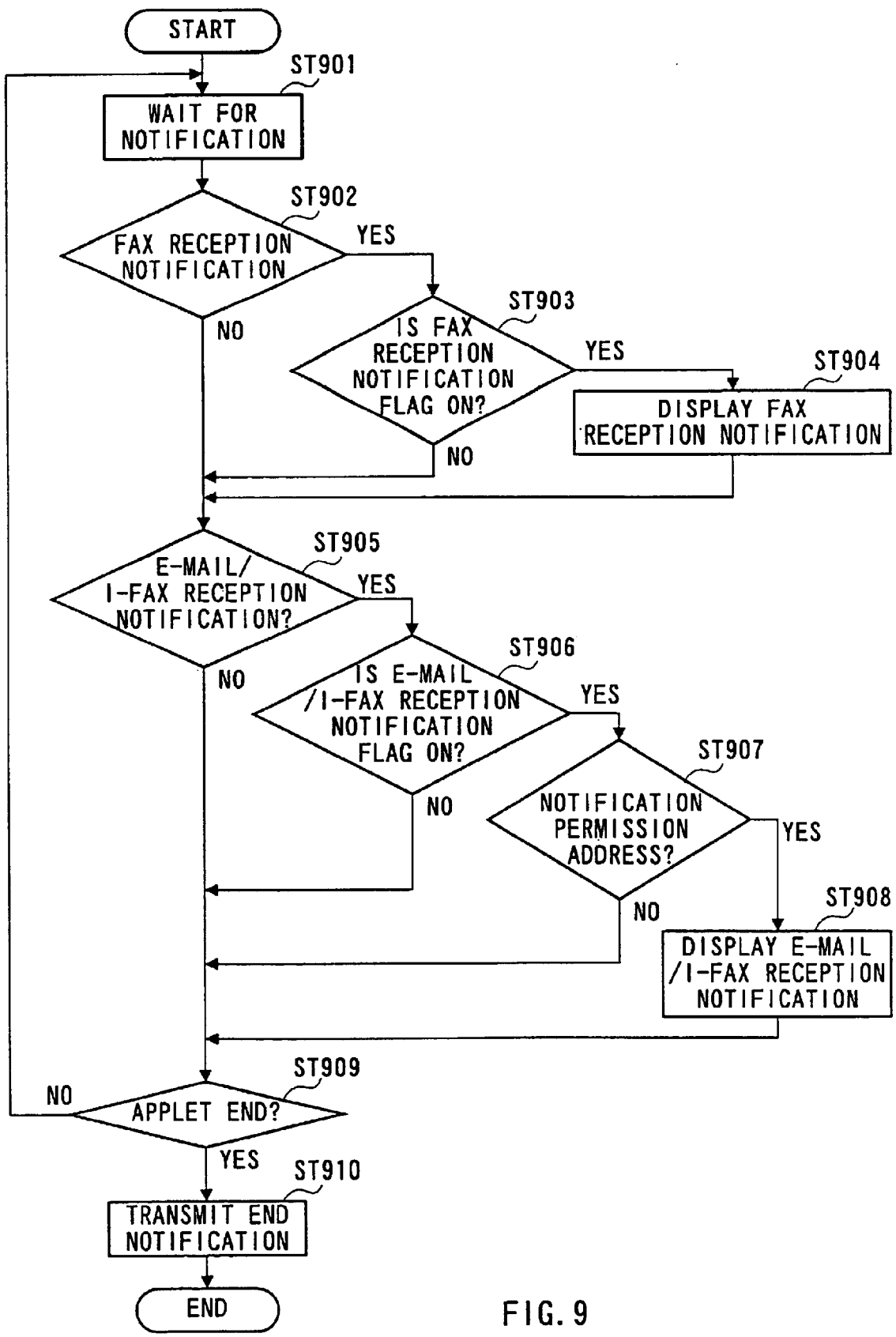
FIG. 9 is a flowchart sowing the respective steps of an applet operation according to the embodiment of the present invention.

Next, the following will explain each step of the operation of the applet, which is operated by PCs 3 to 5. FIG. 9 is a flowchart showing each step of the operation of the applet according to the above embodiment.

When browser module 702 of Java acceptable browser 701, which is executed by PCs 3 to 5, gains access to a boot-up WWW server started by multi-function system 1 and receives Homehtml 1535 and applet class file 536. Java acceptable browser 701 reads this applet class file 536, and executes applet 703. Applet 703 operates as follows:

Applet 703 is set to be in a notification waiting state (ST901). Applet 703 determines whether or not notification is FAX reception notification when receiving notification (ST902). If the notification is FAX reception notification, it is determined whether or not a FAX reception notification flag is on (ST903). If the reception notification is on, applet 703 performs the display of reception notification (ST904). While, if the FAX reception notification flag is off, applet 703 does not perform the display of reception notification.

On the other hand, if the notification is not FAX reception notification in ST902, applet 703 determines whether or not notification is e-mail notification or I-FAX notification (ST905). If the notification is e-mail notification or I-FAX notification, applet 703 determines whether or not E-mail/I-FAX reception notification flag is on (ST906). If E-mail/I-FAX. reception notification flag is on, applet 703 determines whether or not there is a sender's mail address in a notification permission sender list (ST907). Applet 703 recognizes the sender's mail address from the reception notification. If there is a sender's mail address therein, applet 703 performs the display of reception notification (ST908).

While, if E-mail/I-FAX reception notification flag is off in ST906 and there is no sender's mail address in the list in ST907, applet 703 does not perform reception notification.

In ST906, if E-mail/I-FAX reception notification flag is on and nothing is set in the list in ST907, applet 703 performs reception notification.

In ST907, If there is a sender's mail address therein, applet 703 performs the display of reception notification, and If there is no sender's mail address therein, applet 703 does not performs the reception notification. However, applet 703 may perform the display of reception notification when there is no sender' mail address, while applet 703 may not perform the reception notification when there is sender' mail address.

Thereafter, applet 703 checks whether or not there is an instruction of applet end (ST909). If there is no end instruction, the operation goes back to ST901. If there is the end instruction, applet 703 transmits end notification to multi-function system 1 (ST911), and processing is ended. Applet 703 continues to transmit arrive notification to multi-function system 1 every 60 seconds during the operation.

As mentioned above, reception notification is displayed by PCs 3 to 5, and an operator can receive reception data printed by multi-function system 1.

Next, decision of reception notification permission, which is performed by applet 703, will be specifically described as follows:

Java acceptable browser 701 comprises cookie processing section 704, which provides the so-called cookie function. Cookie processing section 704 creates character string information (Cookie) in which setting conditions are described in association with applet 703, and stores it to the file. This character string information includes a flag, which shows whether or not reception notification is executed, and a notification permission sender list, which includes mail address of sender, which permits reception notification.

Figure 10:
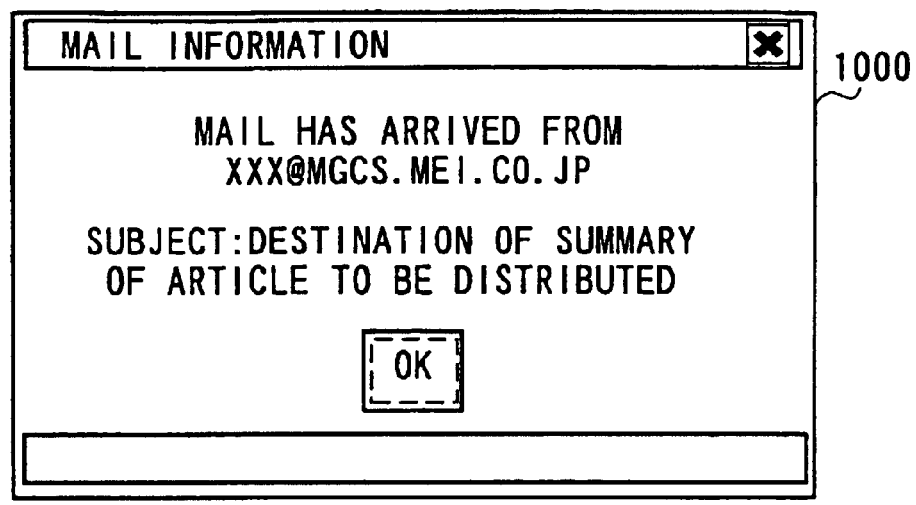
FIG. 10 is a view showing a reception notify window according to the embodiment of the present invention.

Applet 703 determines whether or not reception notification is performed with reference to this character string information. More specifically, if the reception notification flag is on, applet 703 displays reception notification window 1000 as shown in FIG. 10 when receiving reception notification from multi-function system. If the reception notification flag is off, applet 703 does not display reception notification.

Also, applet 703 makes identification of the sender from reception notification received from multi-function system 1 and checks whether or not this sender is included in the notification permission sender list. Applet 703 displays the reception notification window when the reception notification flag is on and the sender is included in the notification permission sender list. While, applet 703 does not display the reception notification window when the reception notification flag is on but the sender is not included in the notification permission sender list. Also, applet 703 displays the reception notification window when the reception notification flag is on and nothing is set in the notification permission sender list.

Figure 11:
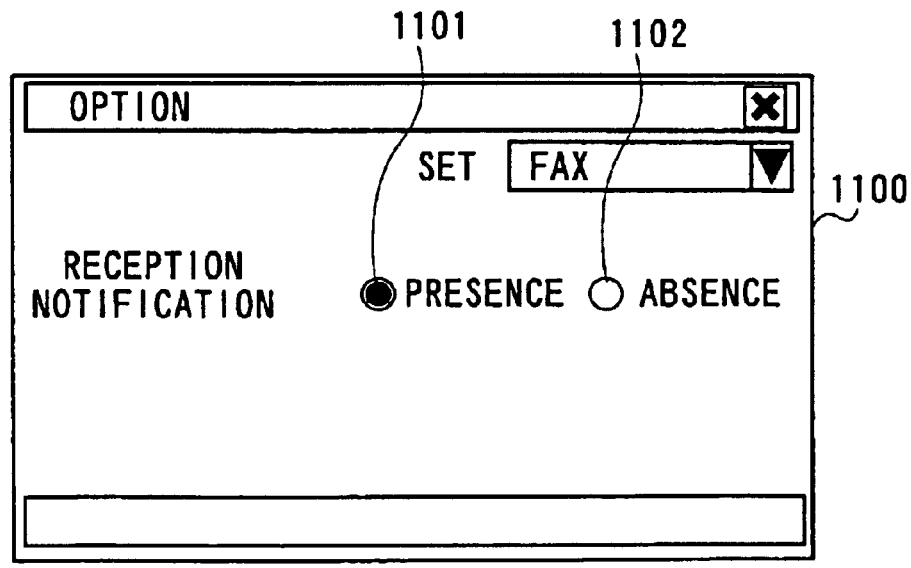
FIG. 11 is a view showing an option setting window according to the embodiment of the present invention.

The reception notification flag included in the above-mentioned character string information can be rewritten from applet 703. Namely, applet 703 displays option setting window 1100 as shown in FIG. 11. Option setting window 1100 includes radio buttons 1101 and 1102 for selecting "presence" and "absence" of reception notification. The operator turns on either one of these radio buttons 1101 and 1102. If the radio button 1101 of "presence" is turned on, applet 703 turns on reception notification flag, and if the radio button 1102 of "absence" is turned on, applet 703 turns off reception notification flag.

Figure 12:
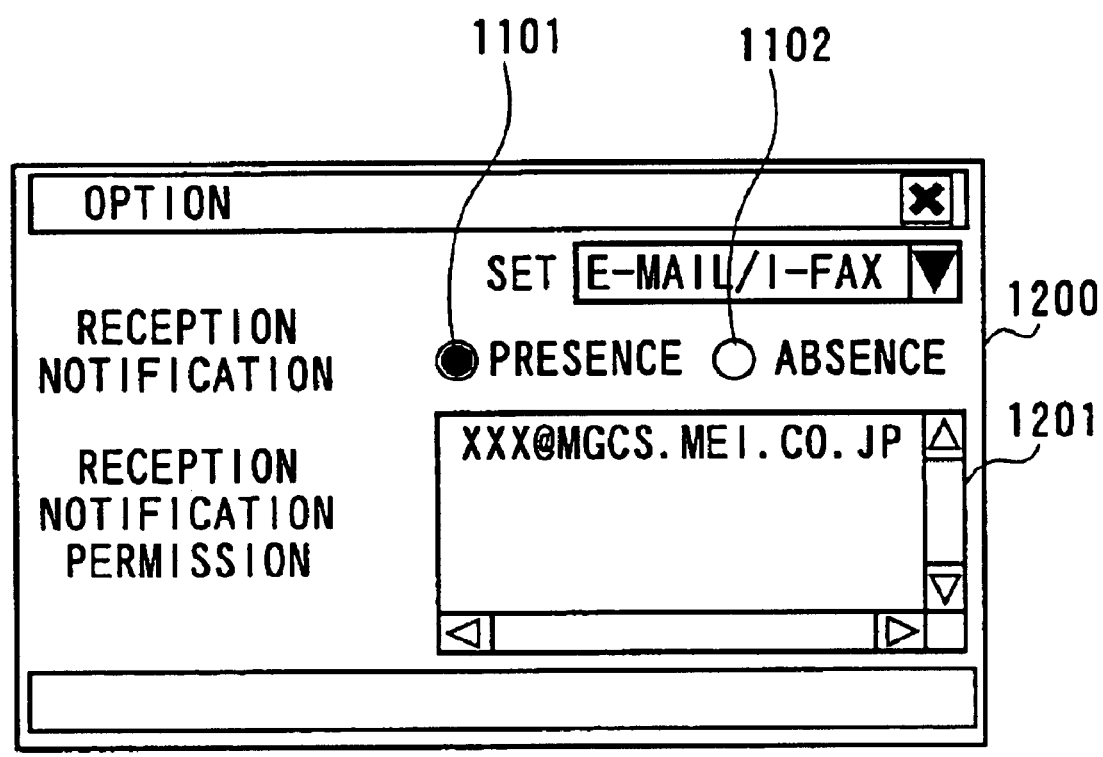
FIG. 12 is a view showing an option setting window according to the embodiment of the present invention.

Also, the notification permission sender list can be rewritten from applet 703. Namely, applet 703 displays option setting window 1200 as shown in FIG. 12. Applet 703 displays list editing area 1201 on option setting window 1200. For example, the operator inputs the mail address of the sender, which permits reception notification as shown in FIG. 12. This allows applet 703 to add the added mail address to the notification permission sender list. This also makes it possible to delete the mail address from the notification permission sender list and to correct the mail address.

Since option setting windows 1100 and 1200 are provided in FAX, e-mail, and I-FAX, respectively, they can be differently set depending on FAX, e-mail, and I-FAX.

As explained above, according to multi-function system 1 of this embodiment, WWW server section 500 starts the WWW server so as to transfer HOME html 535 and applet class file 536 to Java acceptable browser 701 accessed to this WWW server. Java acceptable browser 701 executes applet 703 thereon. This applet 703 establishes a communication line between TCP/IP processing section 601 of multi-function system 1 and applet 703. Then, multi-function system 1 transmits reception notification to applet 703. Applet 703 receives this reception notification, and displays it on the display device of each of PCs 3 to 5.

Since applet 703 is transferred to PCs 3 to 5 from multi-function system 1, only Java acceptable browser 701 may be installed in PCs 3 to 5, and there is no need to install software dedicated to communications with multi-function system 1. This makes it possible to notify PCs 3 to 5 of reception of data at multi-function system 1 without installing software to PCs 3 to 5 when multi-function system 1 is newly connected to LAN 2. The same can be applied to the case of exchanging multi-function system 1. This results in the considerable reduction of time and effort, which is necessary for setting and exchanging multi-function system 1.

Also, according to the aforementioned multi-function system 1, reception notification can be performed in real time. A communication line on LAN 2 is established between reception notification processing section 600 of multi-function system 1 and applet 703 executed on PCs 3 to 4, and reception notification is transmitted to applet 703 from reception notification processing section 600 through this communication line. This allows PCs 3 and 4 to be notified of data reception in substantially real time from multi-function system 1.

In contrast, for example, if reception notification is transmitted to the mail address of PC from the multi-function system by use of e-mail, e-mail including reception notification is once stored in the mail server. Therefore, reception notification is arrived to PC only after the mailer executed by PC gains access to the mall server. In contrast, according to the aforementioned embodiment, applet 703 always waits for reception notification from multi-function system 1. Then, applet 703 displays reception notification on the display device of PC speedily when receiving it.

Thus, in the case of using e-mail, reception notification display time depends on not multi-function system 1 but PC. However, in case of the above-mentioned embodiment, reception notification display time depends on not PC but multi-function system 1. Namely, in the case of using e-mail, reception notification is a pull type, and in the case of the above-mentioned embodiment, reception notification is a push type. In common facsimile apparatuses, it is general that printing is carried out immediately after receiving facsimile data, and the operator knows the presence of data reception by looking at the printed data. The aforementioned embodiment can perform reception notification close to thus general facsimile apparatuses.

Also, according to multi-function system 1, applet 703 performs the presence or absence of reception notification and the management of notification permission for each sender. In the case of management performed by multi-function system 1, it is impossible to change the setting every client unless multi-function system 1 performs discrimination between clients. The application of multi-function system 1 is increased in scale and becomes complicated and a burden on multi-function system 1 is increased as the number of clients increases. According to the above-mentioned embodiment, the application of multi-function system 1 may be small in scale and simple, and the burden on multi-function system 1 can be reduced.

The present invention is not limited to the above-mentioned embodiment. The above embodiment explained the case using the multi-function system as an example. However, the present invention can be applied to a facsimile apparatus connected to a network, particularly IFAX. Namely, the present invention can be applied to the communication apparatus, which receives at least one of facsimile, e-mail and IFAX mail.

The scope of the present invention widely includes an image processing apparatus, an image forming apparatus, an image communication apparatus, an image scanning apparatus, etc. Specifically, the present invention includes a copy machine, a facsimile apparatus, a scanner section, a printer section, and an Internet facsimile apparatus. More specifically, in the case of the copy machine, the scanner and the printer section are mounted thereon. Also, in the case of the facsimile apparatus, the scanner, the printer section, and the facsimile communication section are mounted thereon. Moreover, in the case of the Internet facsimile apparatus, the scanner section and the printer section are mounted thereon, and the facsimile communication section is mounted thereon as required. In the case of the scanner and the printer, one section is of course mounted thereon. Also, the present invention includes an expansion board, which is used to add an Internet facsimile function to the existing copy machine, printer, facsimile apparatus, scanner, etc. Moreover, the present invention includes an expansion board, which is used to add a general facsimile function to the existing copy machine, printer, scanner, etc.

This invention may be conveniently implemented using a conventional general purpose digital computer or microprocessor programmed according to the techniques of the present specification, as will be apparent to those skilled in the computer art. Appropriate software coding can readily be prepared by skilled programmers based on the techniques of the present disclosure, as will be apparent to those skilled in the software art. This invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical disks, CD-ROMs, and magneto-optical disks, ROMs, RAMs, EPROMs, EEPROMs, magnetic or optical cards, or any type of media suitable for storing electronic instructions.

The present invention is not limited to the above described embodiments, and various variations and modifications may be possible without departing from the scope of the present invention.

This application is based on the Japanese Patent Application No.HEI11-223776 filed on Aug. 6, 1999, entire content of which is expressly incorporated by reference herein.

What is claimed is:

1. A communication apparatus connectable to a plurality of terminals via a network, comprising:
   a storage device that stores a HTML file including an applet that performs a reception notification;
   a server that transmits said HTML file stored in said storage device to at least one terminal, of said plurality of terminals, in accordance with a request for said HTML file from said at least one terminal;
   a communicator that connects said at least one terminal with said communication apparatus when a connection request from said at least one terminal is detected, the connection request being made by said applet embedded in said HTML file transmitted to said at least one terminal;
   a receiver that receives at least one of facsimile data and e-mail data; and
   a detector that detects a reception of the at least one of facsimile data and e-mail data by said receiver, said communicator transmitting said reception notification to said at least one connected terminal via the network, utilizing said applet executed by said at least one terminal, when said detector detects said reception of the at least one of facsimile data and e-mail data, said communicator transmitting said reception notification so that the at least one of facsimile data and e-mail data are distinguishable by said at least one terminal, said communicator continuing to connect to said at least one terminal for a predetermined period after an arrive notification is received, said connection to said at least one terminal being terminated when an end notification is received, said arrive notification and said end notification being transmitted from by said applet embedded in said HTML file transmitted to said at least one terminal.

2. The apparatus of claim 1, wherein the e-mail data is transmitted via the Internet.

3. The apparatus of claim 1, wherein said at least one of facsimile data and e-mail data is transmitted to said at least one terminal via a Public Switched Telephone Network (PSTN).

4. The apparatus of claim 1, wherein said applet determines whether a request for said reception notification is valid, said reception notification being transmitted to sa id at least one connected terminal when said request for said reception notification is determined to be valid.

5. The apparatus of claim 1, further comprising a printing device that prints the at least one of facsimile data and e-mail data received by said receiver.

6. The apparatus of claim 1, further comprising a display device that displays said HTML file at said at least one terminal.

7. A method for communicating at least one of facsimile data and e-mail data to at least one terminal of a plurality of terminals on a network, comprising:
   storing a HTML file including an applet that performs a reception notification;
   transmitting the stored HTML file from a server to at least one terminal of the plurality of terminals, in accordance with a request for the HTML file from the at least one terminal;
   performing a data communication with the at least one terminal when a connection request from the at least one terminal is detected, the connection request being made by the applet embedded in the HTML file transmitted to the at least one terminal;
   receiving at least one of facsimile data and e-mail data; and
   detecting a reception of the received at least one of facsimile data and e-mail data, said reception notification being transmitted to said at least one connected terminal via the network, utilizing the applet executed by the at least one terminal, when the reception of the at least one of facsimile data and e-mail data is detected, the reception notification being transmitted so that the at least one of facsimile data and e-mail data is distinguishable by the at least one terminal, the data communication with the at least one terminal being continued for a predetermined period after an arrive notification is received, the data communication with the at least one terminal being terminated when an end notification is received, the arrive notification and the end notification being transmitted by the applet embedded in the HTML file transmitted to the at least one terminal.

8. The method of claim 7, wherein the facsimile data is transmitted via a Public Switched Telephone Network (PSTN).

9. The method of claim 7, wherein the applet further comprises:
   determining whether a valid request for the reception notification has been received; and
   transmitting the reception notification to the at least one terminal when the request for the reception notification is determined to be valid.

* * * * *